US012744863B2

(12) United States Patent
Khandelwal et al.

(10) Patent No.: US 12,744,863 B2
(45) **Date of Patent: *Sep. 22, 2026**

(54) METHOD AND SYSTEM FOR RECORDING A SUPER SLOW MOTION VIDEO IN A PORTABLE ELECTRONIC DEVICE

(71) Applicant: SAMSUNG ELECTRONICS CO., LTD., Suwon-si (KR)

(72) Inventors: Gaurav Khandelwal, Bangalore (IN); Divyanshu Kumar, Bangalore (IN); Saiksha Dhananjay Shetty, Bangalore (IN); Digadari Suman, Bangalore (IN); Alok Shankarlal Shukla, Bangalore (IN); Abhijit Dey, Bangalore (IN); Kiran Nataraju, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/958,911

(22) Filed: Nov. 25, 2024

(65) Prior Publication Data

US 2025/0088605 A1 Mar. 13, 2025

Related U.S. Application Data

(63) Continuation of application No. 18/096,939, filed on Jan. 13, 2023, now Pat. No. 12,185,021, which is a (Continued)

(30) Foreign Application Priority Data

Oct. 4, 2018 (IN) ............................ 201841037632
Sep. 26, 2019 (IN) ........................... 2018-41037632

(51) Int. Cl.
*H04N 5/915* (2006.01)
*G11B 27/00* (2006.01)
*H04N 5/77* (2006.01)

(52) U.S. Cl.
CPC .......... *H04N 5/915* (2013.01); *G11B 27/005* (2013.01); *H04N 5/77* (2013.01)

(58) Field of Classification Search
CPC .......... H04N 5/915; H04N 5/77; H04N 5/783; H04N 5/76; H04N 5/93; H04N 19/587; G11B 27/005
See application file for complete search history.

(56) References Cited

U.S. PATENT DOCUMENTS 5,996,023 A 11/1999 Winter et al.
6,157,391 A 12/2000 Johnson
(Continued)

FOREIGN PATENT DOCUMENTS

CN 1058595 A 11/2000
CN 102611845 A 7/2012
(Continued)

OTHER PUBLICATIONS

Communication dated Jul. 23, 2021 issued by the European Intellectual Property Office in counterpart European Application No. 19868244.5.

(Continued)

*Primary Examiner* — Girumsew Wendmagegn
(74) *Attorney, Agent, or Firm* — Sughrue Mion, PLLC

(57) ABSTRACT

A method performed by an electronic device for generating a slow motion video includes obtaining plural image frames captured at a frame rate from a camera of the electronic device, detecting motion information in a first image frame from among the plural image frames, and performing an interpolation operation using one or more image frames
(Continued)

from among the plural image frames. The one or more image frames are image frames obtained during a predetermined time after the first image frame in which the motion information is detected. A second image frame obtained before the first image frame in which the motion information is detected is discarded from the electronic device. A third image frame obtained after the predetermined time from the first image frame in which the motion information is detected is discarded from the electronic device.

16 Claims, 10 Drawing Sheets

Related U.S. Application Data continuation of application No. 17/536,423, filed on Nov. 29, 2021, now Pat. No. 11,558,581, which is a continuation of application No. 17/007,840, filed on Aug. 31, 2020, now Pat. No. 11,190,728, which is a continuation of application No. 16/593,122, filed on Oct. 4, 2019, now Pat. No. 10,764,530.

(56) References Cited

U.S. PATENT DOCUMENTS 8,023,796 B2 9/2011 Asada et al.
8,830,339 B2 9/2014 Velarde et al.
9,143,693 B1 9/2015 Zhou et al.
9,973,707 B2 5/2018 Lai et al.
2008/0186392 A1 8/2008 Matsuyama
2010/0026898 A1 2/2010 Ueno et al.
2010/0053345 A1 3/2010 Kim et al.
2011/0293244 A1 12/2011 Kuriyama
2012/0051712 A1 3/2012 Furumoto
2012/0189263 A1 7/2012 Kato et al.
2014/0050420 A1 2/2014 Kimura
2014/0176794 A1* 6/2014 Fujishiro ............... G06T 3/4007 348/441
2014/0294320 A1 10/2014 Kokaram et al.
2014/0362918 A1 12/2014 Bushell et al.
2015/0071605 A1 3/2015 Ogawa et al.
2015/0195625 A1 7/2015 Ohbitsu
2016/0100129 A1 4/2016 Im
2016/0182866 A1 6/2016 Landqvist et al.
2016/0225405 A1 8/2016 Matias et al.
2017/0180653 A1 6/2017 Kang et al.
2017/0195539 A1 7/2017 Tung
2018/0035075 A1 2/2018 Lee et al.
2018/0192091 A1 7/2018 Berglund et al.
2018/0225941 A1* 8/2018 Kim ................. G08B 13/19606
2018/0370435 A1 12/2018 Konno
2019/0222797 A1 7/2019 Teruuchi et al.

FOREIGN PATENT DOCUMENTS

CN 103634513 A 3/2014
CN 107040714 A 8/2017
CN 107211091 A 9/2017
CN 107396019 A 11/2017
CN 107666581 A 2/2018
DE 20 2016 003 296 U1 8/2016
EP 3 343 561 A1 7/2018
JP 4765194 B2 9/2011
KR 10-1467875 B1 12/2014
KR 10-2016-0040388 A 4/2016
KR 10-2018-0090696 A 8/2018
WO 99/56216 A1 11/1999
WO 2014/175995 A1 10/2014
WO 2016/096167 A1 6/2016

OTHER PUBLICATIONS

Communication dated Jun. 27, 2024, issued by the China National Intellectual Property Administration in Chinese Application No. 201910953567.3.
Communication dated Mar. 22, 2021 issued by the Indian Patent Office in counterpart Indian Application No. 201841037632.
Communication dated Sep. 13, 2024, issued by the China National Intellectual Property Administration in Chinese Application No. 201910953567.3.
Communication issued on Dec. 19, 2023 by the Indian Patent Office in corresponding IN Patent Application No. 201841037632.
Extended European Search Report dated Jul. 10, 2024, issued by the European Patent Office in European Application No. 24165338.5.
International Search Report (PCT/ISA/210), issued by International Searching Authority in corresponding International Application No. PCT/KR2019/012988, on Jan. 20, 2020.
Office Action issued on Dec. 22, 2023 by the Chinese Patent Office in corresponding CN Patent Application No. 201910953567.3.
Office Action issued on Dec. 28, 2023 by the Vietnam Patent Office in corresponding VN Patent Application No. 1-2021-02400.
Rich Haridy, "Nvidia AI-based system transforms any video into fluid super slow motion", Jun. 18, 2018, retrieved from https://newatlas.com/standard-video-into-slow-motionnvidia/55085/(https://www.youtube.com/watchv=MjViy6kyiqs&feature=youtu.be), (5 pages total).
Communication dated Mar. 13, 2025 issued by the China National Intellectual Property Administration in Chinese Patent Application No. 201910953567.3.
U.S. Appl. No. 18/096,939, filed Jan. 13, 2023.
U.S. Appl. No. 17/536,423, filed Nov. 29, 2021.
U.S. Appl. No. 17/007,840, filed Aug. 31, 2020.
U.S. Appl. No. 16/593,122, filed Oct. 4, 2019.
Communication dated Jun. 23, 2025, issued by the European Patent Office in counterpart European Application No. 24165338.5.

* cited by examiner

Figure 5:
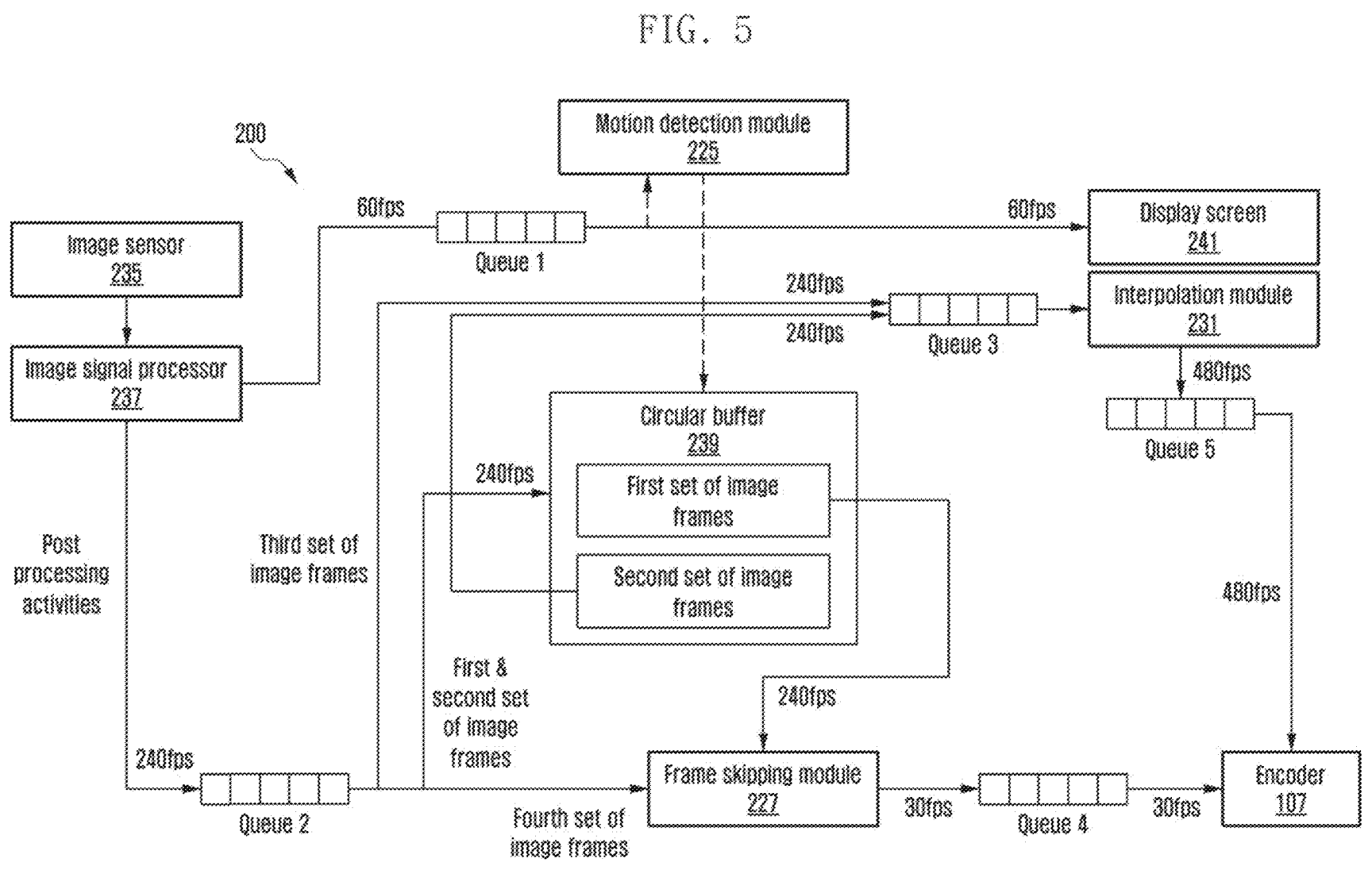

Image sensor 235

Image signal processor 237

Post processing activities

60fps

Queue 1

60fps

Motion detection module 225

Display screen 241

Interpolation module 231

Circular buffer 239

First set of image frames

Second set of image frames

240fps

240fps

Queue 3

480fps

Queue 5

480fps

Encoder 107

240fps

240fps

Third set of image frames

First & second set of image frames

Fourth set of image frames

Frame skipping module 227

30fps

Queue 4

30fps

Queue 2

240fps

Playback (30fps)

METHOD AND SYSTEM FOR RECORDING A SUPER SLOW MOTION VIDEO IN A PORTABLE ELECTRONIC DEVICE

CROSS-REFERENCE TO RELATED APPLICATION

This application is a continuation application of U.S. application Ser. No. 18/096,939 filed Jan. 13, 2023, which is a continuation of U.S. application Ser. No. 17/536,423 filed Nov. 29, 2021 (now U.S. Pat. No. 11,558,581), which is a continuation of U.S. application Ser. No. 17/007,840, filed Aug. 31, 2020 (now U.S. Pat. No. 11,190,728), which is a continuation of U.S. application Ser. No. 16/593,122, filed Oct. 4, 2019 (now U.S. Pat. No. 10,764,530), which is based on and claims priority under 35 U.S.C. § 119 to Indian Patent Provisional Application No. 201841037632, filed on Oct. 4, 2018, and Indian patent application Ser. No. 201841037632, filed on Sep. 26, 2019 in the Indian Intellectual Property Office, the entire contents of each of which being incorporated by reference herein in their entireties.

BACKGROUND

1. Field

The disclosure relates generally to video recording, and more particularly, but not exclusively to, a method and a system for recording a Super Slow Motion (SSM) video in a portable electronic device.

2. Description of Related Art

Super Slow motion is an effect in film-making whereby time and movement appears to be slowed down substantially in a video recording. Generally, commercially available image sensors are used in cameras output frames at 30 fps, 60 fps, 120 fps and 240 fps. Such image sensors are used in mid-tier models of portable electronic devices such as smartphones. However, to obtain image frames at a higher frame rate such as 480 fps, 960 fps and the like, related art smartphones are configured with specialized image sensors such as Fast Readout Sensors (FRS), that are highly expensive. Due to the cost factor, in the related art, configuring the specialized image sensors is a feasible option only in high end models of smartphones that are expensive. However, configuring FRS is not considered in mid-tier and low-tier models of smartphones as providing and configuring FRS increases the cost. Due to the aforementioned issue related to cost of the specialized image sensors, a Super Slow Motion (SSM) recording feature is available only in high end models of smartphones. Clearly, there is a need to provide an economical method and system which enables SSM recording in mid-tier and low-tier models of smartphones.

Related art techniques provide a deep-learning neural network based method that effectively creates a smooth high-quality slow motion videos of videos recorded at a regular frame rate. However, such deep-learning neural network based techniques involve high processing complexity which makes it impossible to configure and execute such techniques in mid-tier and low-tier smartphones. Such techniques cannot record a slow motion video in real-time, but rather merely convert the pre-recorded video into a slow motion video. Yet another related art technique provides a method that processes a video frame stream at a normal speed to the display device and achieves a slow movement of the selected segment. In this technique, each original frame of the selected segment is replicated to generate an extended stream adjacent each original frame. The extended stream, when provided to the display device at a normal speed, creates a slow motion effect. This technique converts a video of normal speed into a slow motion video by replicating the original frames. Replication of the original frames repeat the action captured in each adjacent frame, which results in a poor quality slow motion video.

SUMMARY

In accordance with an aspect of the disclosure, there is provided a method comprising receiving, by a Super Slow Motion (SSM) video recording system associated with a portable electronic device, original image frames captured at a first frame rate by an image capturing device, from the image capturing device; transmitting, by the SSM video recording system, image frames of a second frame rate that are generated by converting original image frames from the first frame rate to the second frame rate, the second frame rate being different than the first frame rate; detecting, by the SSM video recording system, in each of the image frames of the second frame rate whether motion is present using a motion detection library; generating, by the SSM video recording system, a trigger at a current time, in response to detecting motion in at least one of the image frames of the second frame rate; storing, by the SSM video recording system, in a buffer of predefined buffer depth, a first set of image frames, wherein the first set of image frames are the original image frames captured at a time preceding the current time at which the trigger was generated, and a second set of image frames selected, upon the trigger being generated, for performing an interpolation mechanism, wherein the second set of image frames are the original image frames, comprising motion, that were captured prior to the current time at which the presence of motion was detected; generating, by the SSM video recording system, image frames of a third frame rate by converting a frame rate of the second set of image frames and a third set of image frames from the first frame rate to the third frame rate, based on an interpolation mechanism, wherein the third set of image frames are a predefined number of the second set of image frames; generating, by the SSM video recording system, image frames of a fourth frame rate by converting the frame rate of the first set of image frames from the first frame rate to the fourth frame rate; and transmitting, by the SSM video recording system, the image frames of the fourth frame rate, the image frames of the third frame rate, and a fourth set of image frames captured at a time succeeding the current time, in an order, to an encoder for encoding, wherein the frame rate of the fourth set of image frames is converted to the fourth frame rate before transmitting to the encoder.

In accordance with an aspect of the disclosure, there is provided a Super Slow Motion (SSM) video recording system comprising a processor; and a memory communicatively coupled to the processor, wherein the memory stores program code, which, on execution, causes the processor to receive, from an image capturing device, original image frames captured at a first frame rate by the image capturing device; transmit, for display, image frames of a second frame rate generated by converting original image frames from the first frame rate to the second frame rate; detect whether motion is present in each of the image frames of the second frame rate using a motion detection library; generate a trigger at a current time, in response to motion being detected in at least one of the image frames of the second frame rate; store in a buffer of predefined buffer depth, a first set of image frames, wherein the first set of image frames are the original image frames captured at a time preceding the current time at which the trigger was generated, and a second set of image frames selected, upon the trigger being generated, for performing an interpolation mechanism, wherein the second set of image frames are the original image frames, comprising motion, that were captured prior to the current time at which the presence of motion was detected; generate image frames of a third frame rate by converting a frame rate of the second set of image frames and a third set of image frames from the first frame rate to the third frame rate, based on an interpolation mechanism, wherein the third set of image frames are a predefined number of the second set of image frames; generate image frames of a fourth frame rate by converting the frame rate of the first set of image frames from the first frame rate to the fourth frame rate; and transmit the image frames of the fourth frame rate, the image frames of the third frame rate, and a fourth set of image frames captured at a time succeeding the current time, in an order, to an encoder for encoding, wherein the frame rate of the fourth set of image frames is converted to the fourth frame rate before transmitting to the encoder.

In accordance with an aspect of the disclosure, there is provided a method comprising receiving, by a Super Slow Motion (SSM) video recording system associated with a portable electronic device, original image frames from an image capturing device configured in the portable electronic device, wherein the original image frames are captured at a first frame rate; detecting, by the SSM video recording system, a presence of motion in the original image frames using a motion detection library; generating, by the SSM video recording system, image frames of a third frame rate by converting a frame rate of a second set of image frames and a third set of image frames from the first frame rate to the third frame rate, wherein the third frame rate is higher than the first frame rate, wherein the second set of image frames and the third set of image frames are a predefined number of the original image frames comprising motion; generating, by the SSM video recording system, image frames of a fourth frame rate by converting the frame rate of a first set of image frames from the first frame rate to the fourth frame rate, wherein the fourth frame rate is lower than the first frame rate, wherein the first set of image frames are the original image frames captured at a time preceding a current time at which the presence of motion is detected; and transmitting, by the SSM video recording system, the image frames of the fourth frame rate and the image frames of the third frame rate to an encoder associated with the SSM video recording system for recording a SSM video.

In accordance with an aspect of the disclosure, there is provided a Super Slow Motion (SSM) video recording system comprising a processor; and a memory communicatively coupled to the processor, wherein the memory stores program code, which, on execution, causes the processor to receive original image frames from an image capturing device configured in a portable electronic device, wherein the original image frames are captured at a first frame rate; detect a presence of motion from the original image frames using a motion detection library; generate image frames of a third frame rate by converting a frame rate of a second set of image frames and a third set of image frames from the first frame rate to the third frame rate, wherein the third frame rate is higher than the first frame rate, wherein the second set of image frames and the third set of image frames are a predefined number of the original image frames comprising motion; generate image frames of a fourth frame rate by converting the frame rate of a first set of image frames from the first frame rate to the fourth frame rate, wherein the fourth frame rate is lower than the first frame rate, wherein the first set of image frames are the original image frames captured at a time preceding a current time at which the presence of motion is detected; and transmit the image frames of the fourth frame rate and the image frames of the third frame rate to an encoder associated with the SSM video recording system for recording a SSM video.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 shows an exemplary scenario for recording a Super Slow Motion (SSM) video in a portable electronic device, according to an embodiment;

DETAILED DESCRIPTION

Figure 1:
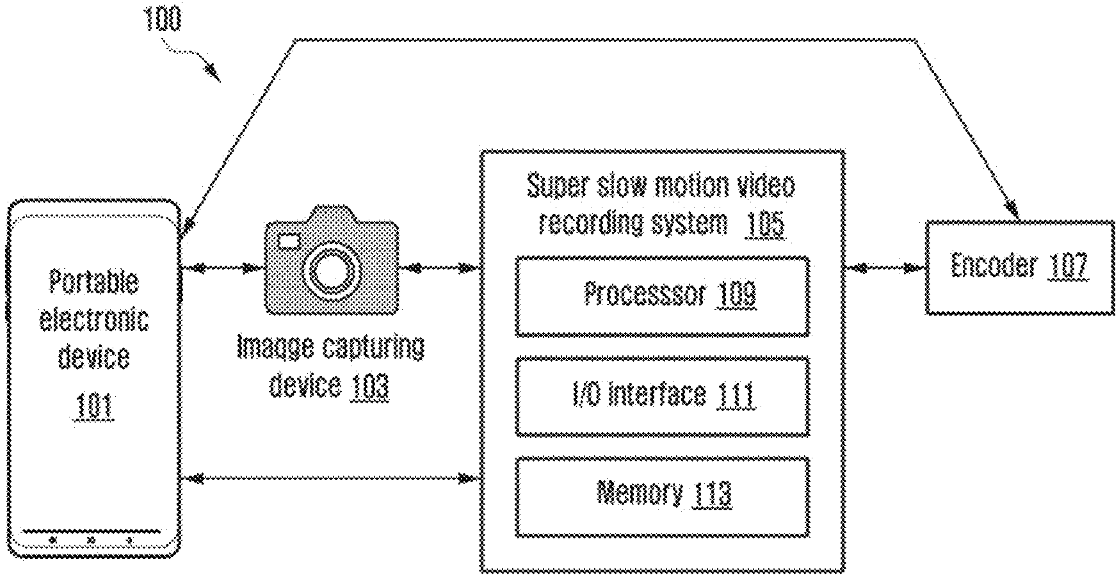
FIG. 1 shows an exemplary architecture for recording a Super Slow Motion (SSM) video in a portable electronic device, according to an embodiment.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of examples in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for recording a Super Slow Motion (SSM) video in a portable electronic device. As an example, the portable electronic device may include, but is not limited to, a smartphone, a tablet, a laptop and the like. A SSM video recording system may be configured to overcome one or more drawbacks mentioned in the background section. In some embodiments, the SSM video recording system records the SSM video based on motion detection, i.e. the SSM video recording system begins SSM recording when motion is detected in at least one image frame. In some embodiments, until motion is detected in at least one image frame, the SSM video recording system subjects the image frames to a frame skipping mechanism. In some embodiments, the frame skipping mechanism may include discarding multiple redundant image frames until the frame rate of the image frames is converted to a desired frame rate. Upon detecting the motion in at least one image frame, the SSM video recording system selects the image frames that capture motion, for performing an interpolation mechanism. In some embodiments, the image frames are selected for the interpolation mechanism in such a way that an effect of motion detection delay that occurred while detecting motion in the image frames is mitigated. In some embodiments, the interpolation mechanism comprises predicting an intermediate image frame between every two consecutive image frames subjected to the interpolation mechanism. Upon performing the interpolation mechanism, the SSM video recording system provides the interpolated image frames and a selected set of image frames subjected to the frame skipping mechanism, in an order, to an encoder associated with the portable electronic device, at a predefined frame rate. The encoder may encode the image frames thus received to be played at a predefined frame rate on the display, thereby achieving the SSM video recording in real-time. In some embodiments, the SSM video recording system may record the SSM video based on scene analysis apart from motion detection, i.e. the SSM recording system may begin SSM recording when a change in human expressions is detected in at least one image frame. The present disclosure is explained in detail in view of motion detection. However, the present disclosure should not be construed as limited only to motion detection, since the same process explained in the further sections, using figures, for motion detection, is applicable for scene analysis as well.

The present disclosure provides a method and a system for recording the SSM video in real-time without the use of specialized image sensors. The specialized image sensors are generally sensors used for capturing image frames at a high frame rate such as 480 fps, 960 fps and the like. Such specialized image sensors are highly expensive when compared to normal commercially available image sensors used for capturing image frames at a normal frame rate such as 30 fps, 60 fps, 120 fps and the like. As discussed in the background section, the specialized image sensors are generally used in high end models of smartphones to record SSM videos, due to their high cost. By contrast, since the exemplary embodiments disclosed herein provide a method to record the SSM video in real-time without the use of specialized sensors, the exemplary embodiments disclosed herein eliminate the cost associated with the specialized image sensors. Therefore, the exemplary embodiments disclosed herein enable the real-time SSM video recording not only in high end models but also in mid-tier models and low-tier models of smartphones. Further, the method is a "light weight" method unlike neural network based methods, and hence, may be easily configured and executed in any model of smartphone without affecting the working of the smartphone. Furthermore, the method generates images frames of a high frame rate based on the interpolation mechanism, which predicts the motion between two image frames. Therefore, the exemplary embodiments disclosed herein achieve improved SSM video recording, unlike the related art techniques which use a replication mechanism for achieving image frames of high frame rate.

In the description that follows, a description of an embodiment with several components in communication with each other does not imply that all such components are required. On the contrary a variety of optional components are described to illustrate the wide variety of possible embodiments.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for recording a Super Slow Motion (SSM) video in a portable electronic device, according to an embodiment.

The architecture 100 includes a portable electronic device 101, an image capturing device 103, a SSM video recording system 105, and an encoder 107. In some embodiments, the portable electronic device 101 may be a smartphone, a laptop, a tablet and the like. In some embodiments, an image capturing device 103 may be configured to communicate with the portable electronic device 101 for capturing images. As an example, the image capturing device 103 may be a camera comprising a commercially available normal image sensor. In some embodiments, the image capturing device 103 may be provided within the portable electronic device 101. In some embodiments, the normal image sensor may be an image sensor capable of capturing image frames at a normal frame rate such as 30 fps, 60 fps, 120 fps, 240 fps and the like. Further, the SSM video recording system 105 may be associated with the portable electronic device 101 via a communication network, and thus may communicate with the portable electronic device 101 through the communication network. The communication network may be at least one of a wired communication network and a wireless communication network. In some embodiments, the SSM video recording system 105 may be configured within the portable electronic device 101.

The SSM video recording system 105 may include a processor 109, an Input/Output (I/O) interface 111 and a memory 113. The processor 109 may be a microprocessor, and in some embodiments, may include a plurality of microprocessors.

The I/O interface 111 receives original image frames from the image capturing device 103, in real-time. In some embodiments, the original image frames may be the image frames captured at a first frame rate. In some embodiments, the first frame rate may be preconfigured in the SSM video recording system 105. As an example, the first frame rate may be 240 fps.

The processor 109 may store the original image frames of the first frame rate in a queue, while simultaneously the processor 109 may transmit corresponding image frames of a second frame rate, for display. In some embodiments, the processor 109 may transmit the corresponding image frames of the second frame rate to the portable electronic device 101 for display thereon. In some embodiments, the processor 109 may generate image frames of the second frame rate from the original image frames, for display. In some embodiments, the second frame rate may be preconfigured in the SSM video recording system 105. In some embodiments, the image frames of the second frame rate may be displayed on a display screen of the portable electronic device 101. As an example, the second frame rate may be 60 fps. Prior to display, the processor 109 may detect a presence of motion from each of the image frames of the second frame rate using a predefined motion detection library. In some other embodiments, the processor 109 may detect the presence of motion in each of the original image frames of the first frame rate. In some embodiments, a Motion Detection (MD) delay may occur while detecting the presence of motion using the predefined motion detection library, due to one or more conditions of a system associated with the predefined motion detection library. As an example, the one or more conditions of the system may include, but not limited to, memory utilization, Central Processing Unit (CPU) utilization and the like. In some embodiments, the frame rate of each of the original image frames stored in the queue may be reduced to the fourth frame rate based on a frame skipping mechanism, until the presence of motion is detected in at least one of the image frames of the second frame rate.

Upon detecting the presence of motion in at least one of the image frames of the second frame rate, the processor 109 may generate a trigger at a current time instance. Further, the processor 109 may store in a buffer of predefined buffer depth, a first set of image frames. In some embodiments, the first set of image frames are the original image frames captured at a time instance preceding the current time instance at which the trigger was generated. Further, the processor 109 may also store in the buffer of the predefined buffer depth, a second set of image frames selected for performing an interpolation mechanism, upon generating the trigger. In some embodiments, the second set of image frames are the original image frames, comprising motion, that were captured prior to the current time instance at which the presence of motion was detected, to mitigate the MD delay. In some embodiments, the processor 109 may be unable to subject the second set of image frames to motion detection due to occurrence of the MD delay. Along with the second set of image frames, the processor 109 may also provide a third set of image frames for the interpolation mechanism. In some embodiments, the third set of image frames are a predefined number of the original image frames comprising motion, that are selected by the processor 109 for performing the interpolation mechanism upon generating the trigger. Further, the processor 109 may generate image frames of a third frame rate by converting a frame rate of the second set of image frames and the third set of image frames from the first frame rate to the third frame rate, based on the interpolation mechanism. In some embodiments, the third frame rate may be predefined in the SSM video recording system 105. As an example, the third frame rate may be 480 fps, 960 fps and the like. Upon generating the image frames of the third frame rate, the processor 109 may generate image frames of a fourth frame rate by converting the frame rate of the first set of image frames from the first frame rate to the fourth frame rate based on a frame skipping mechanism. In some embodiments, the third frame rate may be predefined in the SSM video recording system 105. As an example, the fourth frame rate may be 30 fps. In some embodiments, the second frame rate and the fourth frame rate are lower than the first frame rate. Whereas the third frame rate is higher than the first frame rate.

Finally, the processor 109 may transmit the image frames of the fourth frame rate, the image frames of the third frame rate, and a fourth set of image frames captured at a time instance succeeding the current time instance, in an order, to the encoder 107 associated with the SSM video recording system 105 for encoding. The encoded image frames are recorded as the SSM video, or played back as the SSM video. In some embodiments, the frame rate of the fourth set of image frames may be converted to the fourth frame rate based on the frame skipping mechanism before transmitting to the encoder 107. In some embodiments, the encoder 107 may encode the image frames of the third frame rate to be played at the fourth frame rate on the display screen.

Figure 2:
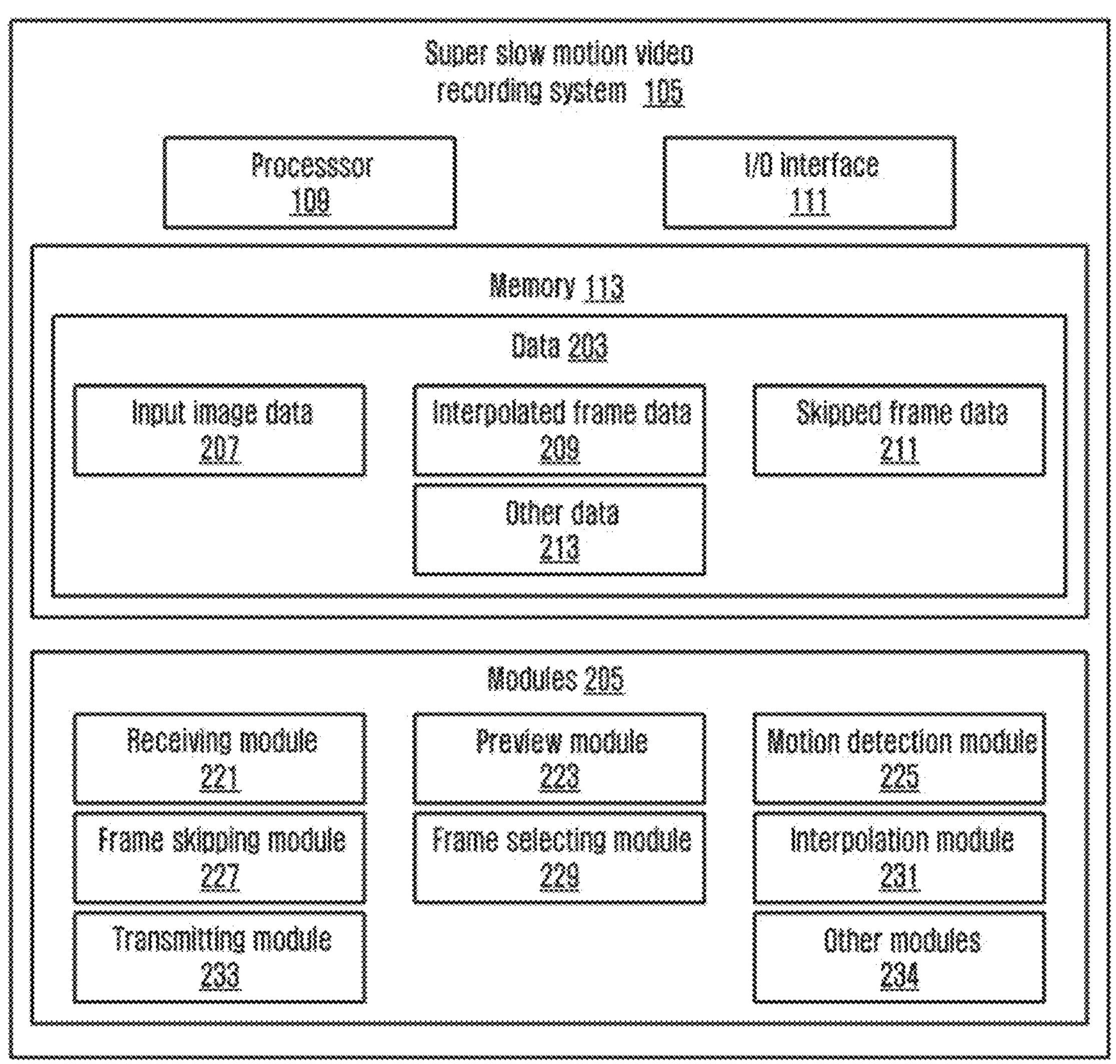
FIG. 2 shows a detailed block diagram of a SSM video recording system of the exemplary architecture of FIG. 1, according to an embodiment.

FIG. 2 shows a detailed block diagram of a Super Slow Motion (SSM) video recording system of the exemplary architecture 100 of FIG. 1, according to an embodiment.

In some implementations, the SSM video recording system 105 may include data 203 and modules 205. As an example, the data 203 is stored in the memory 113 configured in the SSM video recording system 105 as shown in the FIG. 2. In one embodiment, the data 203 may include input image data 207, interpolated frame data 209, skipped frame data 211 and other data 213. The modules 205 are described below in detail.

In some embodiments, the data 203 may be stored in the memory 113 in form of various data structures. Additionally, the data 203 may be organized using data models, such as relational or hierarchical data models. The other data 213 may store data, including temporary data and temporary files, generated by the modules 205 for performing the various functions of the SSM video recording system 105.

In some embodiments, the data 203 stored in the memory 113 may be processed by the modules 205 of the SSM video recording system 105. The modules 205 may be stored within the memory 113. In an example embodiment, the modules 205 communicatively coupled to the processor 109 configured in the SSM video recording system 105, may be provided outside the memory 113 as shown in FIG. 2 and implemented as hardware. As used herein, the term "modules" refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, a preview module 223, a motion detection module 225, a frame skipping module 227, a frame selecting module 229, an interpolation module 231, a transmitting module 233 and other modules 234. The other modules 234 may be used to perform various miscellaneous functionalities of the SSM video recording system 105. It will be appreciated that, in some embodiments, such aforementioned modules 205 may be represented as a single module, or in other embodiments as a combination of different modules.

In some embodiments, the receiving module 221 may initially receive original image frames in real-time from an image capturing device 103 configured to a portable electronic device 101. In some embodiments, the original image frames may be the image frames captured at a first frame rate. The first frame rate may be preconfigured in the SSM video recording system 105. As an example, the first frame rate may be 240 fps. As an example, the image capturing device 103 may be a camera comprising a commercially available normal image sensor. In some embodiments, the normal image sensor may be an image sensor capable of capturing image frames at a normal frame rate such as 30 fps, 60 fps, 120 fps, 240 fps and the like. The original image frames may be subjected to pre-processing that may include noise reduction, auto exposure, auto focus, auto white balance in high speed and high quality and the like. The original image frames thus received may be stored as input image data 207.

Further, in some embodiments, the preview module 223 may transmit the image frames of a second frame rate to the portable electronic device 101 for display. In some embodiments, the image frames of the second frame rate may be generated from the original image frames. In some embodiments, the second frame rate may be preconfigured in the SSM video recording system 105. As an example, the second frame rate may be 60 fps. In some embodiments, the image frames of the second frame rate may be displayed on a display screen of the portable electronic device 101. In some embodiments, the motion detection module 225 may detect presence of motion in the image frames of the second frame rate, prior to transmission for display of the image frames of the second frame rate on the display screen.

In some embodiments, the motion detection module 225 may detect the presence of motion from the image frames of the second frame rate using a predefined motion detection library. In some embodiments, the motion detection module 225 may compare each image frame of the second frame rate with a subsequent image frame of the second frame rate and correlate a result of the comparison thus determined with data stored in the predefined motion detection library to detect presence of motion. In some embodiments, the motion detection module 225 may compare each image frame of the second frame rate with a next image frame of the second frame rate immediately following the each image frame. However, a Motion Detection (MD) delay may occur while detecting the presence of motion using the predefined motion detection library, due to one or more conditions of a system associated with the predefined motion detection library. As an example, the one or more conditions of the system may include, but not limited to, memory utilization, Central Processing Unit (CPU) utilization, processing delay, memory availability and the like. Due to such MD delay, the motion detection module 225 may actually miss detecting the presence of motion in a few image frames of the second frame rate, though motion is present in those image frames of the second frame rate. Therefore, generally when the motion detection module 225 detects the presence of motion in at least one image frame of the second frame rate, a few image frames of the second frame rate that were captured prior to the current time instance at which the motion was detected, are also considered to be the image frames comprising motion. This is to mitigate the MD delay in detecting the presence of motion in the image frames. In some embodiments, until the motion detection module 225 detects the presence of motion in at least one of the image frames of the second frame rate, the frame rate of each of the original image frames is reduced to a fourth frame rate based on a frame skipping mechanism. In some embodiments, the fourth frame rate may be preconfigured in the SSM video recording system 105. As an example, the fourth frame rate may be 30 fps.

In some embodiments, the frame skipping mechanism may be performed by a frame skipping module 227. The frame skipping mechanism may include discarding multiple redundant image frames from the original image frames until the frame rate of the original image frames is converted to a desired frame rate. As an example, consider that the original image frames are at the frame rate 240 fps and the desired frame rate is 30 fps. Therefore, by using the frame skipping mechanism, the multiple redundant frames, which do not contain any motion, may be discarded until the frame rate of the original image frames reduces to 30 fps from 240 fps. The process of frame skipping mechanism is explained below with reference to FIG. 3A and FIG. 3B.

Figure 3A:
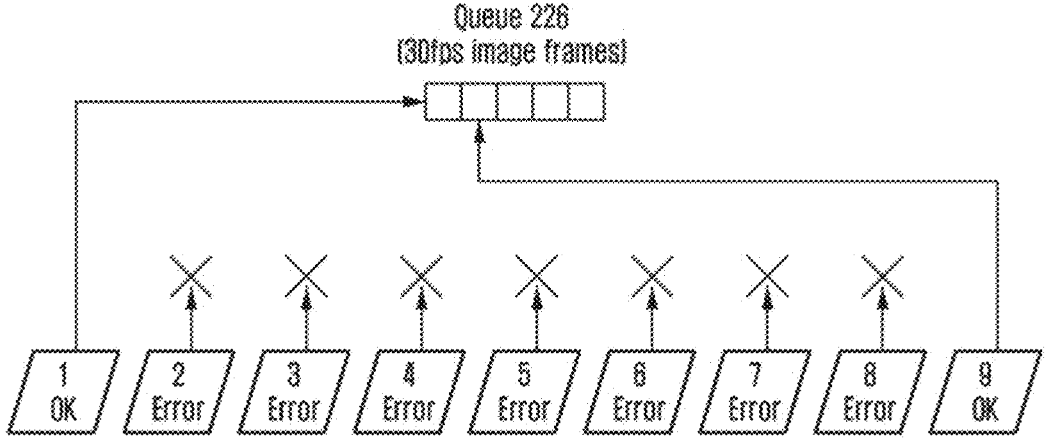
FIG. 3A and FIG. 3B show an exemplary illustration of a frame skipping mechanism, according to embodiments.
Figure 3B:
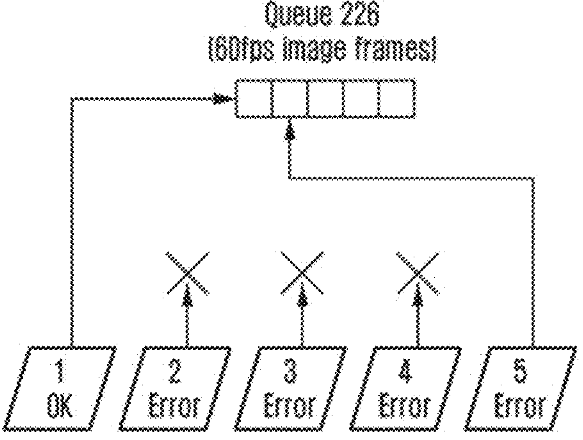

FIG. 3A and FIG. 3B show an exemplary illustration of a frame skipping mechanism, according to embodiments. As shown in the FIG. 3A, consider an example in which the original image frames are stored in a queue 226 before applying the frame skipping mechanism. In some embodiments, the queue 226 may be included in the memory 113. In some embodiments, the input rate of the original image frames is less than the output rate of the original image frames. Therefore, the queue is introduced to manage transmission of the original image frames to the frame skipping module 227 prior to subjecting the original image frames to the frame skipping mechanism. Consider an example in which the original image frames are at the frame rate 240 fps and the desired frame rate is 30 fps. Therefore, to achieve the frame rate of 30 fps, the number of image frames have to be reduced from 240 to 30 per second, which means one image frame out of every eight image frames are selected. Accordingly, the frame skipping module 227 may consider the original image frames in an order as received from the queue. As shown in the FIG. 3A, the frame skipping module 227 may mark one original image frame from a set of 8 original image frames as "OK" and may mark rest of the 7 image frames in the set of 8 original image frames as "ERROR" or "IGNORE", etc. Therefore, the frame skipping module 227 may retain the original image frame marked as "OK" and discard the rest of the original image frames marked as "ERROR". The frame skipping module 227 may further repeat the same process for subsequent sets of 8 original image frames, until the number of image frames are reduced from 240 to 30 image frames per second. Similarly, as an example, consider the original image frames are at the frame rate 240 fps and the desired frame rate is 60 fps. Therefore, to achieve the frame rate of 60 fps, the number of image frames are reduced from 240 to 60 per second, which means one image frame out of every four image frames are selected. Accordingly, the frame skipping module 227 may mark one image frame from a set of 4 original image frames as "OK" and rest of the 3 original images frames as "ERROR" or "IGNORE", etc., as shown in the FIG. 3B. In some embodiments, the one original image frame marked as "OK" may be a first image frame in the set of the 8 original image frames or the set of 4 original image frames as selected by the frame skipping module 227. In some other embodiments, the one original image frame marked as "OK" may be any image frame in the set of the 8 original image frames or the set of 4 original image frames as selected by the frame skipping module 227. In yet other embodiments, the frame skipping module 227 may select the one original image frame marked as "OK" based on one or more predefined selection factors, from the set of the 8 original image frames or the set of 4 original image frames.

In some embodiments, upon detecting the motion in at least one of the image frames of the second frame rate, in a current time instance, the motion detection module 225 may generate a trigger to indicate the presence of motion. Further, the processor 109 may initialize a buffer of a predefined buffer depth. In some embodiments, the buffer may be a circular buffer. In some embodiments, the predefined buffer depth may be determined using the below Equation 1.

$$\text{Buffer depth} = \text{Number of } MD \text{ delay frames} + \text{Initial low } fps \text{ frames required} \quad \text{Equation 1}$$

In the above Equation 1, "Buffer depth" denotes the size of the buffer; "Initial low fps frames required" (also referred as a first set of image frames in later sections of the present disclosure) denotes the number of original image frames of a time instance, that do not include any detectable motion, that are selected for the frame skipping mechanism; and "Number of MD delay frames" (also referred as a second set of image frames in later sections of the present disclosure) denotes the number of original image frames passed in real-time during motion detection. In this scenario, the original image frames passed in real-time are the original image frames that could not be subjected to motion detection due to the occurrence of the MD delay.

In some embodiments, the number of MD delay frames, i.e. the second set of image frames, may be detected using the below Equation 2.

$$\text{Number of } MD \text{ delay frames} = \left(\frac{\text{Estimated } MD \text{ delay (in ms)}}{1000} \times \text{Sensor } fps\right) \quad \text{Equation 2}$$

In the above Equation 2, "Estimated MD delay" denotes MD delay which is expected at the time of motion detection; and "Sensor fps" denotes the frame rate of the image sensor used in the image capturing device 103 to capture the original image frames. In some embodiments, the estimated MD delay may vary for different models of the portable electronic devices 101 as the system parameters and conditions such as processing capacity, speed, memory availability and the like vary for each model of the portable electronic device 101.

As an example, consider that the sensor fps is 240 fps and the estimated MD delay is 28 ms. By substituting these values in the above Equation 2, the processor 109 determines the number of MD delay frames to be 7.

Further, consider that the initial low fps frames required, i.e. the first set of image frames, are image frames of 30 fps for 0.3 seconds. Therefore, the total number of the 240 fps original image frames for 0.3 seconds should be converted to 30 fps image frames for 0.3 seconds. The number of original image frames of 240 fps for 0.3 seconds would be (240*0.3), which is 72 original image frames. The processor 109 provides these 72 original image frames, at a later stage (explained below in the subsequent paragraphs), to the frame skipping mechanism to convert the frame rate of the 72 original image frames from 240 fps to 30 fps.

Further, the processor 109 determines the buffer depth by substituting the initial low fps frames required, and the number of MD delay frames determined using Equation 2, in the above Equation 1. Therefore, in this example, the buffer depth is 79, which is a sum of 72 image frames and the 7 MD delay frames.

Since the MD delay, frame rate of the image sensor, and the number of initial low fps frames required are defined according to the requirement, the buffer depth is accordingly predefined in the SSM video recording system 105.

Referring back to the motion detection module 225, when the motion detection module 225 generates the trigger, the frame selecting module 229 may select and store the first set of image frames and the second set of image frames in the buffer. In some embodiments, the first set of image frames are the original image frames captured at a time instance preceding the current time instance at which the trigger was generated. The frame selecting module 229 selects the first set of image frames for performing the frame skipping mechanism. In some embodiments, the second set of image frames are the original image frames of the current time instance, comprising motion, that were captured prior to the time when the presence of motion was detected. The second set of image frames are used for mitigating/compensating the MD delay in detecting the presence of motion in the image frames. The frame selecting module 229 selects the second set of image frames for performing an interpolation mechanism. The frame selecting module 229 further selects a third set of image frames for performing the interpolation mechanism. In some embodiments, the third set of image frames are a predefined number of the original image frames, comprising motion, selected for performing the interpolation mechanism upon generating the trigger. The third set of image frames are the image frames of the current time instance that are captured after the image frame of the second frame rate in which the presence of motion was detected by the motion detection module 225. The frame selecting module 229 may provide the second set of image frames and the third set of image frames to the interpolation module 231 for performing the interpolation mechanism. In some embodiments, the input rate of the second set of image frames and the third set of image frames is faster than the output rate of the image frames generated by the interpolation module 231. Therefore, to manage the transmission of the second set of image frames and the third set of image frames to the interpolation module 231, a queue is introduced to store the second set of image frames and the third set of image frames.

In some embodiments, the interpolation mechanism may include, but is not limited to, predicting an intermediate image frame between every two consecutive image frames of the second set of image frames and/or between every two consecutive image frames of the third set of image frames, using one or more predefined frame predicting techniques. An exemplary illustration of the interpolation mechanism is as shown in the FIG. 4.

Figure 4:
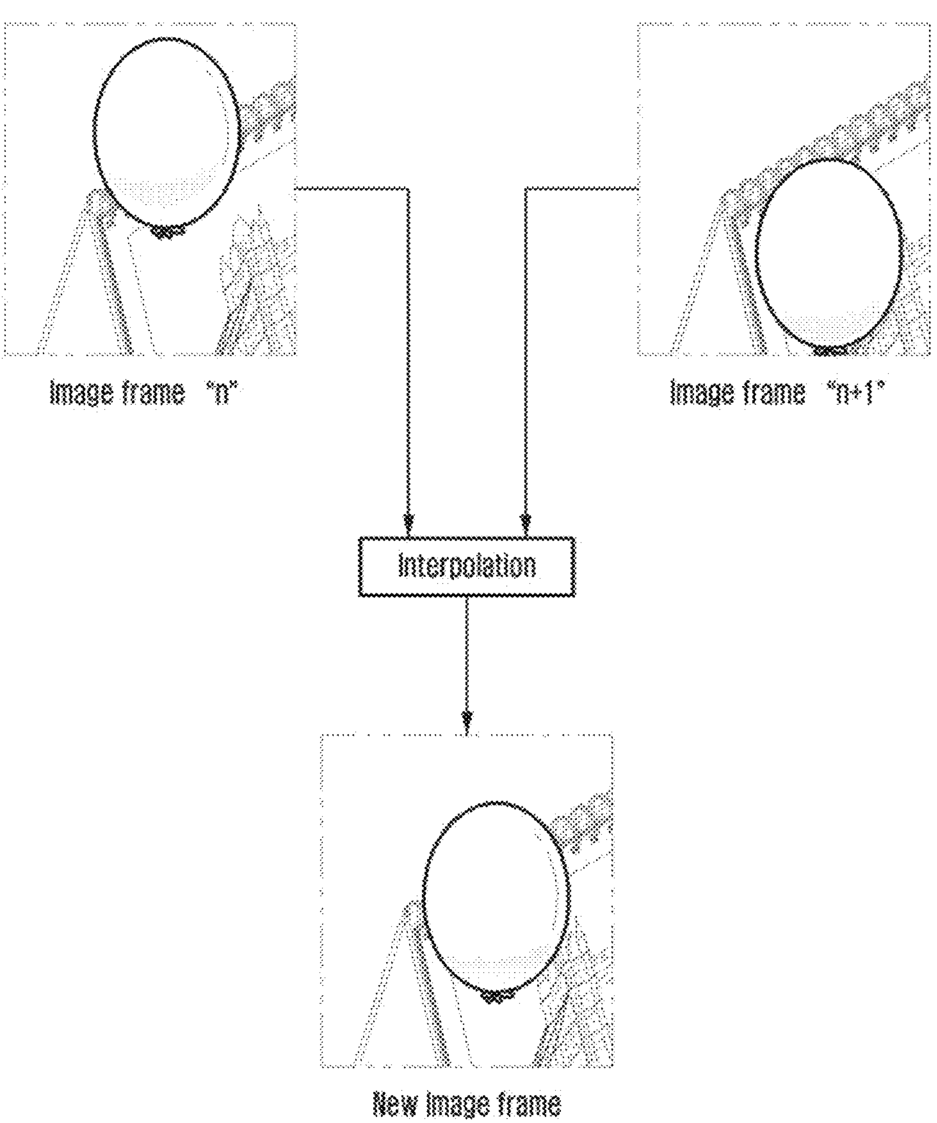
FIG. 4 shows an exemplary illustration of an interpolation mechanism, according to an embodiment.

FIG. 4 shows an exemplary illustration of an interpolation mechanism, according to an embodiment. In FIG. 4, image frame "n" and image frame "n+1" are two exemplary consequent image frames of either the second set of image frames or the third set of image frames. When the image frame "n" and image frame "n+1" are provided to the interpolation module 231, the interpolation module 231 may interpolate a new image frame between the image frame "n" and image frame "n+1". In some embodiments, the interpolation module 231 may generate the new image frame for interpolation by predicting the image frame between the image frame "n" and image frame "n+1", i.e. by predicting motion of a principle object between the image frame "n" and image frame "n+1", as shown in FIG. 4. In the example shown in FIG. 4, the principle object is a ball, whose position change has been predicted and indicated in the new image frame, relative to the position of the ball in the image frame "n" and image frame "n+1".

In some embodiments, using the interpolation mechanism explained above, the interpolation module 231 may generate image frames of a third frame rate by interpolating a new image frame between every two consecutive image frames of the second set of image frames and/or between every two consecutive image frames of the third set of image frames. In some embodiments, the third frame rate may be preconfigured in the SSM video recording system 105. As an example, the third frame rate may be 480 fps, 960 fps and the like. The image frames subjected to the interpolation mechanism and the image frames generated using the interpolation mechanism may be stored as the interpolated frame data 209.

In parallel with the operation above, the frame skipping module 227 may generate image frames of a fourth frame rate by converting the frame rate of the first set of image frames from the first frame rate to the fourth frame rate based on the frame skipping mechanism explained above. In some embodiments, the fourth frame rate may be preconfigured in the SSM video recording system 105. As an example, the fourth frame rate may be 30 fps. As an example, consider that the first frame rate is 240 fps and the fourth frame rate is 30 fps. In such scenarios, the frame skipping module 227 may consider sets of 8 image frames each, continuously, and select one image frame from each set, while discarding rest of the 7 image frames from each set, until the image frames of 240 fps are converted to image frames of 30 fps, as described above with respect to FIGS. 3A and 3B. In some embodiments, the second frame rate and the fourth frame rate may be lower than the first frame rate. Whereas the third frame rate is higher than the first frame rate.

Further, the frame selecting module 229 may select a fourth set of images for performing the frame skipping mechanism. In some embodiments, the fourth set of image frames may be the image frames that are captured at a time instance succeeding the current time instance. In other words, the fourth set of image frames are the image frames captured after the third set of image frames selected for the interpolation mechanism. In some embodiments, the fourth set of images may or may not comprise the presence of motion. The frame selecting module 229 may provide the fourth set of images to the frame skipping module 227 for performing the frame skipping mechanism. In some embodiments, the frame skipping module 227 may convert the frame rate of the fourth set of image frames from the first frame rate to the fourth frame rate using the frame skipping mechanism. In some embodiments, the fourth set of image frames upon being subjected to the frame skipping mechanism may be referred as terminating image frames. The image frames subjected to the frame skipping mechanism and the image frames generated as a result of the frame skipping mechanism may be stored as the skipped frame data 211.

Further, in some embodiments, the transmitting module 233 may transmit the image frames of the fourth frame rate, the image frames of the third frame rate, and the terminating image frames, in an order, to an encoder 107, for encoding. Further, in some embodiments, at least one queue may be introduced for managing transmission of the image frames of the fourth frame rate, the image frames of the third frame rate, and the terminating image frames to the encoder 107. That is, in some embodiments, the image frames to be transmitted may be stored in at least one queue prior to transmission to the encoder 107. In some embodiments, the encoder 107 may be associated with the SSM video recording system 105. In some embodiments, the encoder 107 may be in communication with the SSM video recording system 105. The encoder 107 may convert and store the image frames thus received, into a digital format which may be displayed/viewed on a display screen of the portable electronic device 101. In some embodiments, the encoder 107 may encode and store the image frames of the third frame rate to be played at the fourth frame rate on the display screen.

Upon encoding, the encoder 107 may initially play the image frames of the fourth frame rate, then the image frames of the third frame rate at the fourth frame rate, and thereafter the terminating image frames, each, at the fourth frame rate, on the display screen. In some embodiments, the encoder 107 may be communicatively coupled to the portable electronic device 101 and may provide the image frames to the portable electronic device 101 for playing. In some embodiments, the encoder 107 may be provided within the portable electronic device 101 and may thus initially play the image frames on the display screen of the portable electronic device 101. The image frames of the third frame rate that are encoded to be played at the fourth frame rate enables the SSM video recording system 105 to achieve the effect of Super Slow Motion recording.

Henceforth, the process of recording the SSM video in the portable electronic device 101 is explained with the help of one or more examples for better understanding of the present disclosure. However, the one or more examples should not be considered as a limitation of the present disclosure.

FIG. 5 shows an exemplary scenario for recording a Super Slow Motion (SSM) video in a portable electronic device, according to an embodiment. Consider an exemplary scenario as shown in the FIG. 5, and consider the following exemplary details for explaining the process of recording the SSM video in the portable electronic device in the exemplary scenario:

Portable electronic device: Smartphone
Image capturing device: Camera
Image sensor: Normal commercially available sensor with Frame Rate (FR) 240 fps.
First FR: 240 fps
Second FR: 60 fps
Third FR: 480 fps
Fourth FR: 30 fps In the example of FIG. 5, the image sensor 235, the image signal processor 237, the motion detection module 225, the circular buffer 239, the frame skipping module 227, the display screen 241, the interpolation module 231, and the encoder 107 may be provided on the portable electronic device 101. That is, FIG. 1 shows the architecture 100 as including separate components. However, in some embodiments, the components of the architecture 100 may be included within the portable electronic device 101 itself.

Consider the camera configured in the smartphone captures original image frames at 240 fps. As shown in the FIG. 5, the Image Signal Processor (ISP) 237 component of the camera is configured to process one or more signals received from the image sensor 235 configured in the camera, while capturing the original image frames. The ISP 237 processes the one or more signals into two streams of image frames. In some embodiments, one stream comprises the original image frames of frame rate 240 fps which are transmitted for performing post processing activities via queue 2, and another stream comprises image frames of frame rate 60 fps, which are transmitted for preview display on a display screen of the smartphone via queue 1, as shown in the FIG. 5. However, before the image frames of 60 fps are displayed on the display screen, the image frames are routed to the motion detection module 225 for detecting the presence of motion in the image frames, i.e. the motion detection module 225 checks whether principle objects in the image frames of 60 fps contain any kind of motion or not. Until the presence of motion is detected, the original image frames of 240 fps are reduced to image frames of 30 fps using the frame skipping mechanism. The processor 109 may manage transmission of the original image frames of 240 fps to the frame skipping module 227 through a queue 2 as shown in the FIG. 5, for performing the frame skipping mechanism.

Consider that the presence of motion is detected in an image frame of 60 fps, with a MD delay of 28 ms. Further, consider that the image frame of 60 fps in which the motion is detected, corresponds to an image frame "X" of 240 fps provided by the ISP 237. Due to the MD delay, a few image frames captured after the image frame "X" could not be subjected to motion detection. Therefore, the frame selecting module 229 selects 7 image frames of 240 fps as the second set of image frames (also referred as MD delay frames) to compensate the MD delay of 28 ms, using the equation 2 described above. The 7 MD delay image frames of 240 fps are the frames that were captured immediately prior to the current time instance at which the motion is detected in the image frame of 60 fps. In other words, the current time instance is the time instance at which the trigger is generated. Further, consider the frame selecting module 229 selects the first set of images of 240 fps captured before the 7 MD delay image frames, for an interval of 0.3 seconds. Therefore, totally the frame selecting module 229 may select (240 fps*0.3), i.e. 72 image frames of 240 fps, as the first set of image frames. The first set of image frames do not contain any motion, but are used for ensuring a continuity to the SSM video. The frame selecting module 229 now stores the first set of image frames and the second set of image frames in the circular buffer 239 as shown in the FIG. 5. Further, consider the frame selecting module 229 selects the third set of image frames of 240 fps, that are captured after the image frame "X", such that the 7 MD delay image frames, the image frame "X" and the third set of images together form an interval of 0.4 seconds. For the interval of 0.4 seconds, totally the frame selecting module 229 should select (240 fps*0.4), i.e. 96 image frames. However, since the 7 MD delay frames and the image frame "X" are already selected, therefore, the frame selecting module 229 now selects remaining 88 image frames of 240 fps as the third set of image frames. The third set of image frames contain motion, which is a continuation of the motion detected in the image frame "X". Further, consider the frame selecting module 229 selects a fourth set of image frames of 240 fps, that are captured after the 88 third set of image frames, for an interval of 0.3 seconds. Therefore, totally the frame selecting module 229 may select (240 fps*0.3), i.e. 72 image frames of 240 fps, as the fourth set of image frames. The fourth set of image frames may or may not contain motion, but are used to ensure continuity to the SSM video.

Therefore, upon receiving the trigger indicating the presence of motion from the motion detection module 225, the processor 109 transmits the 72 first set of image frames of 240 fps to the frame skipping module 227. In parallel, the processor 109 transmits the 7 second set of image frames of 240 fps, the image frame "X", and the 88 third set of image frames (totally 96 image frames) to the interpolation module 231, through the queue 3 as shown in the FIG. 5. The frame skipping module 227 converts the 72 first set of image frames of 240 fps to 9 image frames of 30 fps using the frame skipping mechanism. On the other hand, the interpolation module 231 converts the 96 image frames of 240 fps into 192 frames of 480 fps by interpolating a new image frame between every two consecutive image frames. The interpolation module 231 predicts the motion of the principle object in every new image frame based on the motion of the principle object in the corresponding two consecutive image frames.

Upon converting, the processor 109 transmits that 9 image frames of 30 fps obtained from 72 first set of image frames of 240 fps to the encoder 107 through the queue 4 as shown in the FIG. 5. Thereafter, the processor 109 transmits the 192 image frames of 480 fps obtained from 96 image frames (7 MD delay frames, image frame "X", and 88 third set of image frames) of 240 fps to the encoder 107 through the queue 5 as shown in the FIG. 5. Finally, the processor 109 sends the 72 fourth set of image frames of 240 fps to the frame skipping module 227 to obtain 9 image frames of 30 fps (also referred as terminating image frames) and thereafter transmits the 9 terminating image frames of 30 fps to the encoder 107 through the queue 4 as shown in the FIG. 5. This flow of transmitting the exemplary image frames to the encoder 107 while recording the SSM video, as explained in the paragraph above, is pictorially represented in the FIG. 6A.

Figure 6A:
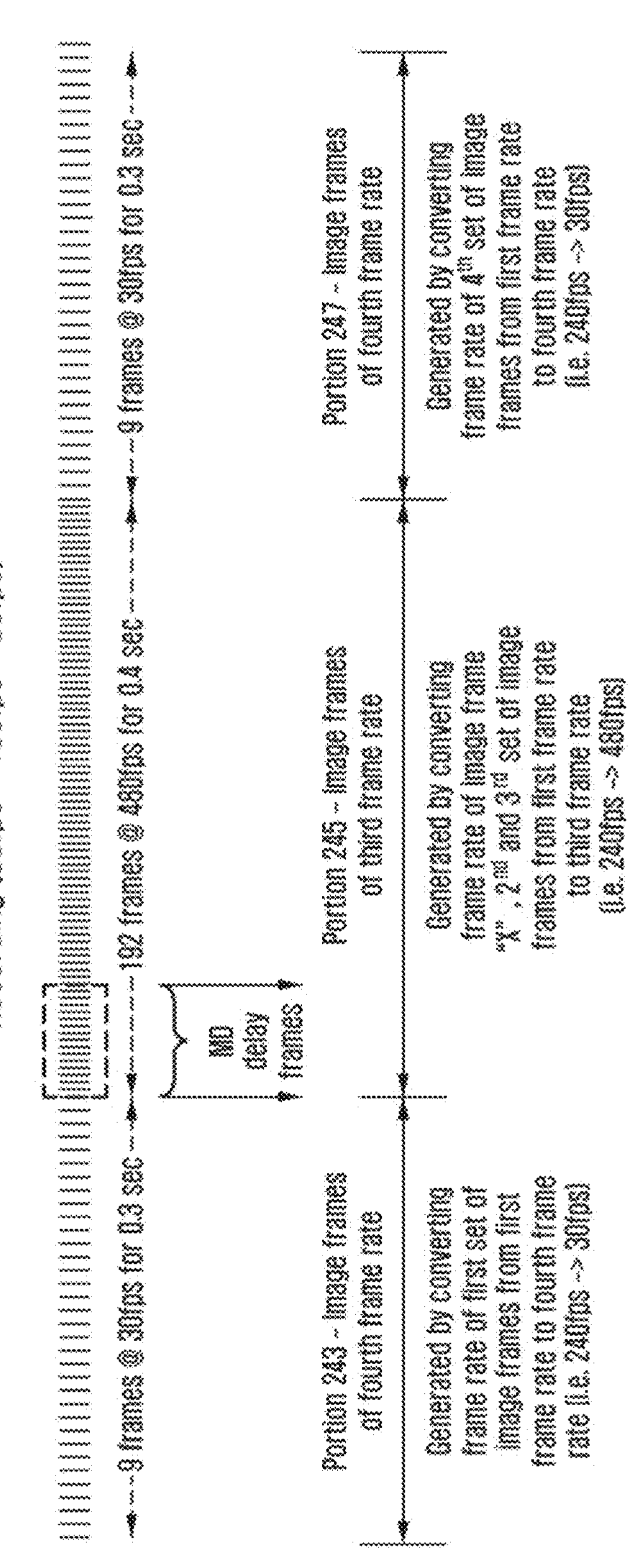
FIG. 6A and FIG. 6B show, respectively, an exemplary illustration of recording and playback of exemplary image frames, according to embodiments.
Figure 6B:
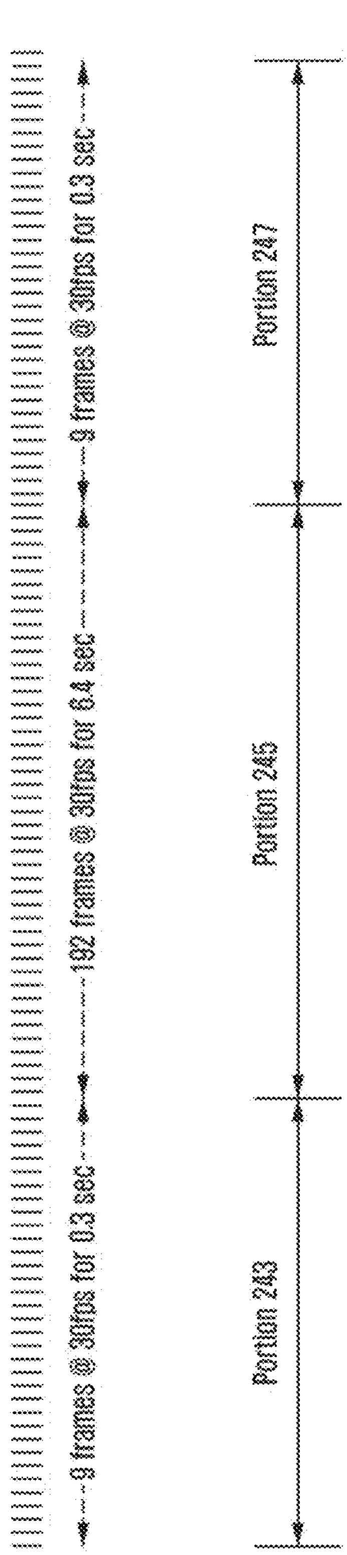

FIG. 6A and FIG. 6B show, respectively, an exemplary illustration of recording and playback of exemplary image frames, according to embodiments. As shown in the FIG. 6A, portion 243 of 0.3 seconds time interval comprises 9 image frames of 30 fps obtained from 72 first set of image frames of 240 fps. Further, portion 245 of 0.4 seconds time interval comprises 192 image frames of 480 fps obtained from 96 image frames of 240 fps. Finally, portion 247 of 0.3 seconds time interval comprises 9 terminating image frames of 30 fps. FIG. 6B shows the playback of the encoded image frames, wherein initially image frames of the portion 243 are played at 30 fps for the time interval of 0.3 seconds, thereafter image frames of the portion 245 which are of frame rate 480 fps are played at 30 fps, due to which the original recorded and encoded image frames of 0.4 seconds time interval are displayed as super slow motion at 30 fps for 6.4 seconds time interval. Finally, the image frames of portion 247 are played at 30 fps.

Figure 7:
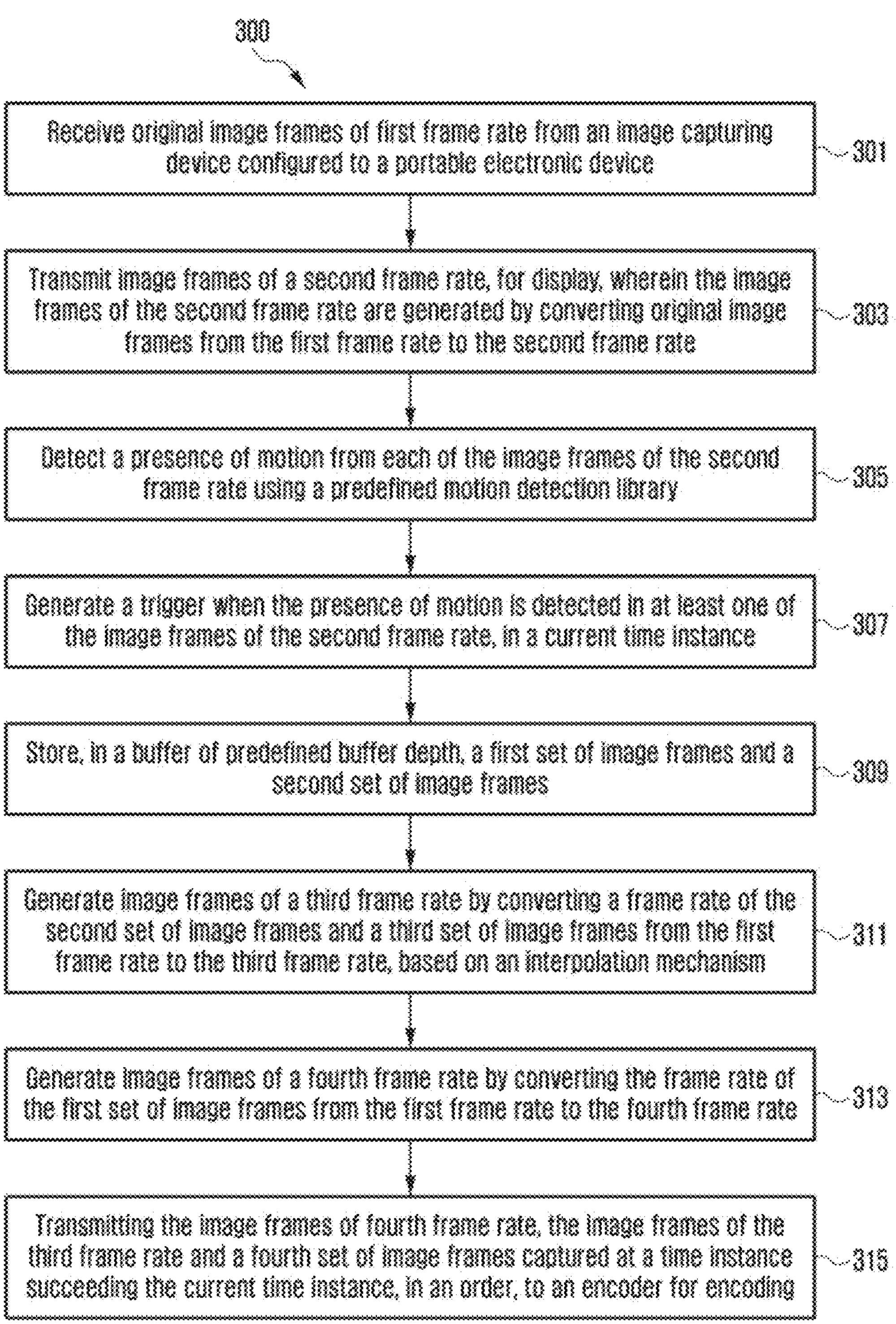
FIG. 7 shows a flowchart illustrating a method of recording a SSM video in a portable electronic device, according to an embodiment.

FIG. 7 shows a flowchart illustrating a method of recording a SSM video in a portable electronic device, according to an embodiment.

As illustrated in FIG. 7, the method 300 includes one or more blocks illustrating a method of recording a Super Slow Motion (SSM) video in a portable electronic device 101. The method 300 may be described in the general context of computer executable code. Generally, computer executable code may include instructions, routines, programs, objects, components, data structures, procedures, modules, and functions, which are loaded onto a processor and executed to perform functions or implement data types.

The order in which the method 300 is described is not intended to be construed as a limitation, and any number of the described method blocks may be combined in any order to implement the method 300. Additionally, individual blocks may be deleted from the method 300 without departing from the spirit and scope of the subject matter described herein. Furthermore, the method 300 may be implemented in any suitable hardware, software, firmware, or combination thereof.

At block 301, the method 300 may include receiving, by a processor 109 configured in a SSM video recording system 105 of the portable electronic device 101, original image frames from an image capturing device 103 configured in the portable electronic device 101. In some embodiments, the original image frames may be captured at a first frame rate. As an example, the first frame rate may be 240 fps.

At block 303, the method 300 may include transmitting, by the processor 109, image frames of a second frame rate, for display. In some embodiments, the processor 109 may generate the image frames of the second frame rate from the original image frames. As an example, the second frame rate may be 60 fps.

At block 305, the method 300 may include detecting, by the processor 109, a presence of motion from each of the image frames of the second frame rate using a predefined motion detection library.

At block 307, the method 300 may include generating, by the processor 109, a trigger when the presence of motion is detected in at least one of the image frames of the second frame rate, in a current time instance.

At block 309, the method 300 may include storing, by the processor 109, a first set of image frames and a second set of image frames in a buffer of predefined buffer depth. In some embodiments, the first set of image frames are the original image frames captured at a time instance preceding the current time instance at which the trigger is generated. In some embodiments, the second set of image frames are the original image frames of the current time instance, comprising motion, that were captured prior to the current time instance at which the presence of motion was detected, to mitigate a Motion Detection (MD) delay. The first set of image frames are selected for performing a frame skipping mechanism and the second set of image frames are selected for performing an interpolation mechanism upon generating the trigger. In some embodiments, the frame skipping mechanism may include discarding multiple redundant image frames from the original image frames until the frame rate of the original image frames is converted to a desired frame rate. In some embodiments, the interpolation mechanism may include predicting an intermediate image frame between every two consecutive second set of image frames and the third set of image frames, using one or more predefined frame predicting techniques.

At block 311, the method 300 may include generating, by the processor 109, image frames of a third frame rate by converting a frame rate of the second set of image frames and a third set of image frames from the first frame rate to the third frame rate, based on the interpolation mechanism. In some embodiments, the third set of image frames are a predefined number of the original image frames comprising motion, selected for performing the interpolation mechanism upon generating the trigger. The third set of image frames are the image frames captured after the image frame of the second frame rate in which the presence of motion was detected.

At block 313, the method 300 may include generating, by the processor 109, image frames of a fourth frame rate by converting the frame rate of the first set of image frames from the first frame rate to the fourth frame rate based on the frame skipping mechanism.

At block 315, the method 300 may include transmitting, by the processor 109, the image frames of the fourth frame rate, the image frames of the third frame rate and a fourth set of image frames captured at a time instance succeeding the current time instance, in an order, to an encoder 107 for encoding. In some embodiments, the encoder 107 is associated with the SSM video recording system 105. The processor 109 may convert frame rate of the fourth set of image frames to the fourth frame rate, based on the frame skipping mechanism, before transmitting them to the encoder 107.

Figure 8:
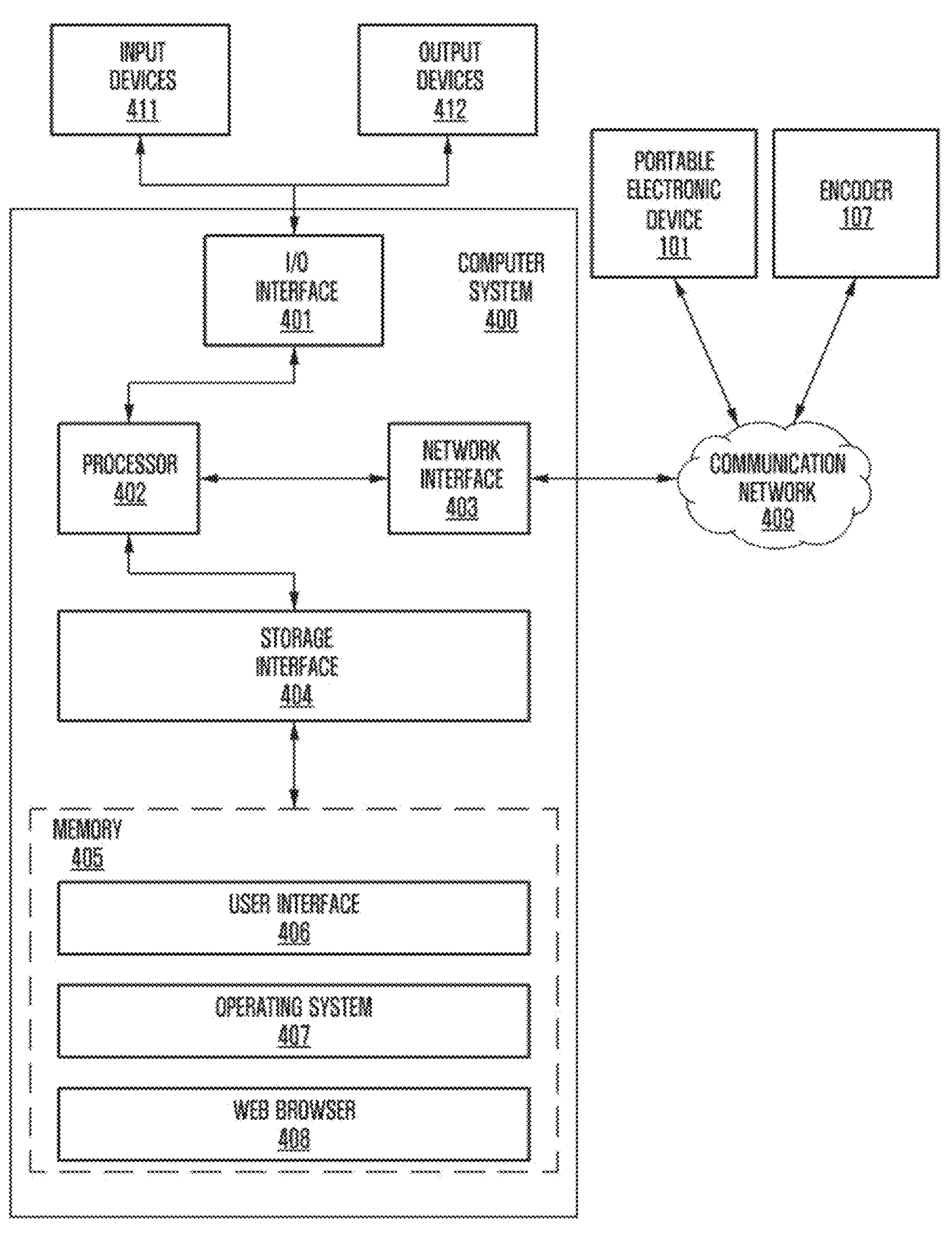
FIG. 8 is a block diagram of an exemplary computer system for implementing embodiments, according to an embodiment.

FIG. 8 is a block diagram of an exemplary computer system for implementing embodiments, according to an embodiment.

FIG. 8 illustrates a block diagram of an exemplary computer system 400 for implementing embodiments consistent with the present invention. In some embodiments, the computer system 400 may be a Super Slow Motion (SSM) video recording system 105 that is used for recording a SSM video in a portable electronic device 101. The computer system 400 may include a central processing unit ("CPU" or "processor") 402. The processor 402 may include at least one data processor for executing program components for executing user or system-generated business processes. A user may include a person, a person using a device such as those included in this disclosure, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a portable electronic device 101 and an encoder 107. The communication network 409 may be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The portable electronic device 101 may include, but is not limited to, a smartphone, a laptop, a tablet, and the like. In some embodiments, the processor 402 may be disposed in communication with a memory 405 (e.g., RAM, ROM, etc. not shown in FIG. 8) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

Operating system 407 may facilitate resource management and operation of computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. User interface 406 may facilitate display, execution, interaction, manipulation, or operation of program components through textual or graphical facilities. For example, user interfaces may provide computer interaction interface elements on a display system operatively connected to computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

Computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. Computer system 400 may implement a mail server stored program component. The mail server may be an Internet mail server such as Microsoft Exchange, or the like. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store computer executable code for execution by one or more processors, including computer code for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for recording a Super Slow Motion (SSM) video in a portable electronic device. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the disclosed subject matter. It is therefore intended that the scope be limited not by this detailed description, but rather by any claims that issue on an application based here on. Accordingly, the embodiments are intended to be illustrative, but not limiting, of the scope of the invention, which is set forth in the following claims.

In accordance with an aspect of the disclosure, there is provided a super slow motion video recording system comprising the processor converting the frame rate of the first set of image frames and the frame rate of the fourth set of image frames from the first frame rate to the fourth frame rate based on a frame skipping mechanism.

In accordance with an aspect of the disclosure, there is provided a super slow motion video recording system comprising the frame skipping mechanism discarding multiple redundant image frames from the original image frames until the frame rate of the original image frames is converted to a desired frame rate.

In accordance with an aspect of the disclosure, there is provided a method comprising receiving, by a Super Slow Motion (SSM) video recording system associated with a portable electronic device, original image frames from an image capturing device configured in the portable electronic device, wherein the original image frames are captured at a first frame rate, detecting, by the SSM video recording system, a presence of motion in the original image frames using a motion detection library, generating, by the SSM video recording system, image frames of a third frame rate by converting a frame rate of a second set of image frames and a third set of image frames from the first frame rate to the third frame rate, wherein the third frame rate is higher than the first frame rate, wherein the second set of image frames and the third set of image frames are a predefined number of the original image frames comprising motion, generating, by the SSM video recording system, image frames of a fourth frame rate by converting the frame rate of a first set of image frames from the first frame rate to the fourth frame rate, wherein the fourth frame rate is lower than the first frame rate, wherein the first set of image frames are the original image frames captured at a time preceding a current time at which the presence of motion is detected, and transmitting, by the SSM video recording system, the image frames of the fourth frame rate and the image frames of the third frame rate to an encoder associated with the SSM video recording system for recording a SSM video.

In accordance with an aspect of the disclosure, there is provided the method comprising the image frames of the third frame rate being generated based on an interpolation mechanism.

In accordance with an aspect of the disclosure, there is provided the method comprising the image frames of the fourth frame rate being generated based on a frame skipping mechanism.

In accordance with an aspect of the disclosure, there is provided the method comprising converting, by the SSM video recording system, the frame rate of a fourth set of image frames from the first frame rate to the fourth frame rate, wherein the fourth set of image frames are image frames captured at a time succeeding the current time, transmitting, by the SSM video recording system, the fourth set of image frames, to the encoder, along with the image frames of the fourth frame rate and the image frames of the third frame rate, for encoding.

In accordance with an aspect of the disclosure, there is provided a super slow motion video recording system comprising a processor, and a memory communicatively coupled to the processor, wherein the memory stores program code, which, on execution, causes the processor to: receive original image frames from an image capturing device configured in a portable electronic device, wherein the original image frames are captured at a first frame rate; detect a presence of motion from the original image frames using a motion detection library, generate image frames of a third frame rate by converting a frame rate of a second set of image frames and a third set of image frames from the first frame rate to the third frame rate, wherein the third frame rate is higher than the first frame rate, wherein the second set of image frames and the third set of image frames are a predefined number of the original image frames comprising motion, generate image frames of a fourth frame rate by converting the frame rate of a first set of image frames from the first frame rate to the fourth frame rate, wherein the fourth frame rate is lower than the first frame rate, wherein the first set of image frames are the original image frames captured at a time preceding a current time at which the presence of motion is detected, and transmit the image frames of the fourth frame rate and the image frames of the third frame rate to an encoder associated with the SSM video recording system for recording a SSM video.

In accordance with an aspect of the disclosure, there is provided the super slow motion video recording system comprising the processor generating the image frames of the third frame rate based on an interpolation mechanism.

In accordance with an aspect of the disclosure, there is provided the super slow motion video recording system comprising the processor generating the image frames of the fourth frame rate based on a frame skipping mechanism.

In accordance with an aspect of the disclosure, there is provided the super slow motion video recording system comprising the processor converting frame rate of a fourth set of image frames from the first frame rate to the fourth frame rate, wherein the fourth set of image frames are the image frames captured at a time instance succeeding the current time instance, and transmitting the fourth set of image frames to the encoder, along with the image frames of the fourth frame rate and the image frames of the third frame rate, for encoding.

What is claimed is:

1. A method performed by an electronic device for generating a slow motion video, the method comprising:

obtaining a plurality of image frames captured at a predetermined frame rate from at least one camera of the electronic device;

detecting motion information in at least one first image frame from among the plurality of image frames;

performing an interpolation operation using a first set of image frames and a second set of image frames; and discarding at least one image frame which is not used in the interpolation operation performed based on the obtained plurality of image frames captured at the predetermined frame rate, wherein the first set of image frames include image frames within a certain time or within a certain number of frames preceding the at least one first image frame in which the motion information is detected, and wherein the second set of image frames include image frames within a certain time or within a certain number of frames following the at least one first image frame in which the motion information is detected.

2. The method of claim 1, further comprising:

encoding one or more image frames resulting from the interpolation operation in the electronic device at a frame rate.

3. The method of claim 2, wherein the frame rate is lower than the predetermined frame rate.

4. The method of claim 1, wherein the plurality of image frames are stored in a circular buffer of the electronic device and a size of the circular buffer is determined based on a delay for detecting the motion information.

5. The method of claim 1, wherein the plurality of image frames are stored in a circular buffer of the electronic device and a size of the circular buffer is determined based on the predetermined frame rate.

6. The method of claim 1, wherein the motion information includes a change in human expressions.

7. The method of claim 6, wherein the motion information is detected using a motion detection library.

8. The method of claim 1, further comprising:

storing one or more image frames resulting from the interpolation operation in a memory of the electronic device.

9. An electronic device comprising:

at least one camera;

a memory; and at least one processor configured to:

obtain a plurality of image frames captured at a predetermined frame rate from the at least one camera, detect motion information in at least one first image frame from among the plurality of image frames, and perform an interpolation operation using a first set of image frames and a second set of image frames; and discard at least one image frame which is not used in the interpolation operation performed based on the obtained plurality of image frames captured at the predetermined frame rate, wherein the first set of image frames include image frames within a certain time or within a certain number of frames preceding the at least one first image frame in which the motion information is detected, wherein the second set of image frames include image frames within a certain time or within a certain number of frames following the at least one first image frame in which the motion information is detected.

10. The electronic device of claim 9, wherein the at least one processor is further configured to encode one or more image frames resulting from the interpolation operation in the memory at a frame rate.

11. The electronic device of claim 10, wherein the frame rate is lower than the predetermined frame rate.

12. The electronic device of claim 9, wherein the memory is a circular buffer and a size of the circular buffer is determined based on a delay for detecting the motion information.

13. The electronic device of claim 9, wherein the memory is a circular buffer and a size of the circular buffer is determined based on the predetermined frame rate.

14. The electronic device of claim 9, wherein the motion information includes a change in human expressions.

15. The electronic device of claim 9, wherein the at least one processor is further configured to detect a change of the motion information using a motion detection library.

16. The electronic device of claim 9, wherein the at least one processor is further configured to:

store one or more image frames resulting from the interpolation operation in the memory of the electronic device.

* * * * *